United States Patent [19]

Rapsey et al.

[11] Patent Number: 4,594,499
[45] Date of Patent: Jun. 10, 1986

[54] APPARATUS FOR PRODUCING A LINE OF SEPARATION IN A PLASTIC WORK SURFACE

[75] Inventors: Colin Rapsey, Watford; John H. Elworthy, Whaddon, both of England

[73] Assignee: Protocol Engineering Limited, Berkhamsted, England

[21] Appl. No.: 572,299

[22] Filed: Jan. 20, 1984

[30] Foreign Application Priority Data

Jan. 21, 1983 [GB] United Kingdom ............... 8301710

[51] Int. Cl.[4] .................. H05B 3/00; H05B 1/02; B62D 7/10
[52] U.S. Cl. .................................. 219/221; 30/140; 83/16; 83/171; 219/229; 219/238; 219/241
[58] Field of Search ............ 83/170, 171, 15, 16; 30/140; 219/221, 233, 235, 243, 227-231, 236-241

[56] References Cited

U.S. PATENT DOCUMENTS

| | | | |
|---|---|---|---|
| 1,008,922 | 11/1911 | MacLagan | 219/238 |
| 1,137,573 | 4/1915 | Carr | 219/236 |
| 2,773,163 | 12/1956 | Boyajean | 219/233 X |
| 3,002,802 | 10/1961 | Rich | 219/241 X |
| 3,469,479 | 9/1969 | Calemard | 83/171 X |
| 3,555,950 | 1/1971 | Gijsbers et al. | 219/229 |
| 3,593,615 | 7/1971 | Shelton | 83/171 X |
| 4,204,448 | 5/1980 | Pearl | 83/170 X |
| 4,381,009 | 4/1983 | Del Bon | 219/241 X |

FOREIGN PATENT DOCUMENTS

| | | | |
|---|---|---|---|
| 2150585 | 10/1971 | Fed. Rep. of Germany | 219/241 |
| 242587 | 10/1946 | Switzerland | 30/140 |
| 386623 | 12/1933 | United Kingdom . | |
| 718311 | 11/1954 | United Kingdom . | |
| 1152798 | 5/1968 | United Kingdom . | |
| 1128207 | 9/1968 | United Kingdom | 219/243 |
| 1165458 | 10/1969 | United Kingdom . | |

*Primary Examiner*—A. Bartis
*Attorney, Agent, or Firm*—Biebel, French & Nauman

[57] ABSTRACT

An apparatus for forming a line of separation in a plastic work surface includes a tool having a tool holder of thermally conductive material, an electric heating element and a tool member having a separating point. The holder is surrounded by an insulating member and includes a sleeve portion in which the tool member is releasably secured, the tool member projecting from the body in freely exposed manner with the separating point remote from the holder whereby the work surface may be engaged solely by the separating point which comprises a tip from which a surrounding surface extends in divergent manner. The holder is arranged to conduct heat from the heating element to the tip and suitable control means are provided for regulating the heating element temperature to a desired value. The apparatus is adapted to traverse the tool in orthogonal directions across a work-support surface in a head movably mounted above the surface, the tool being releasably mounted in a clamping arm of a pivotable lever having an actuating arm, actuating means engaging the actuator arm to bring the separating point of the tool into and out of engagement with the work on work-supporting surface by pivotal movement of the lever.

Since the separating point is freely exposed the depth of penetration into the work is not effected adversely by surface irregularities or cutting swarf on the work but is determined by the point form, temperature rate of movement and pressure on the work.

12 Claims, 8 Drawing Figures

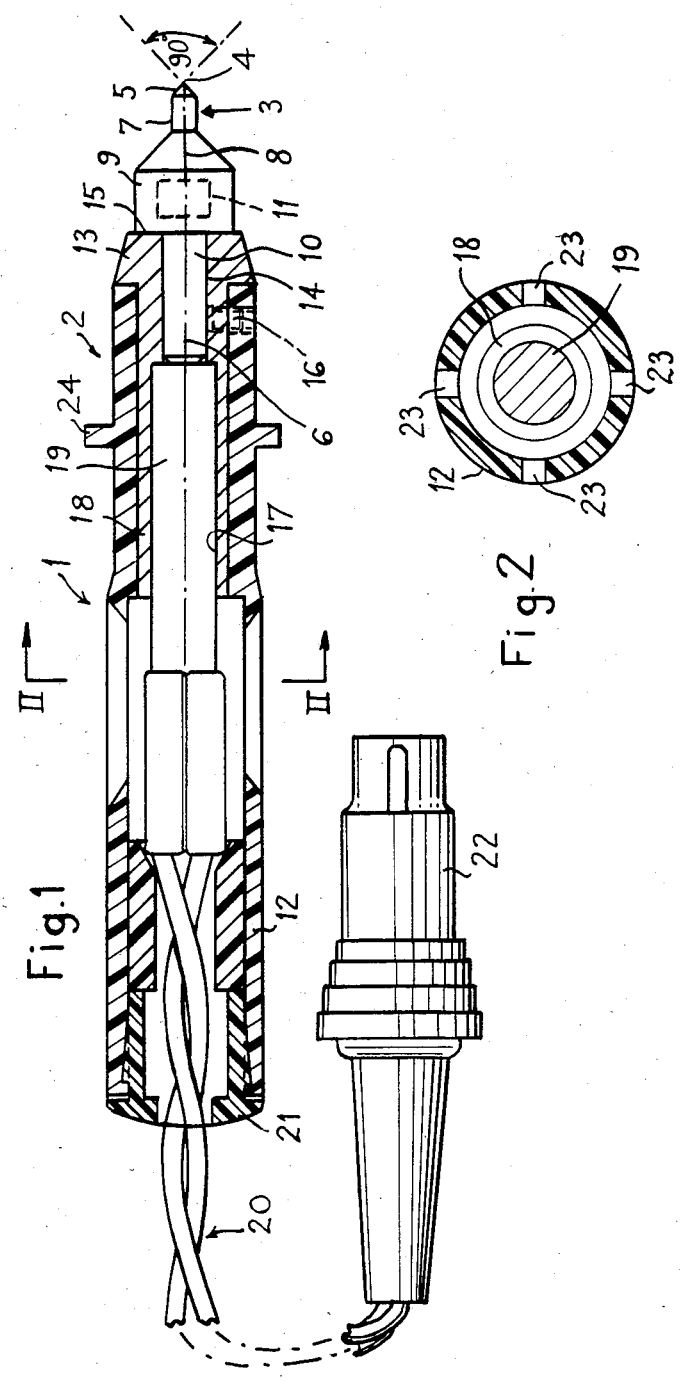

APPARATUS FOR PRODUCING A LINE OF SEPARATION IN A PLASTIC WORK SURFACE

The present invention relates to the separation of areas of material from a sheet of the same material, of plastics or like materials. More particularly, but not exclusively, the present invention relates to the separation of areas of plastics material from a plastics sheet for the production of masks for selective exposure, and primarily in the making of printing plates and for contacting film.

In the lay-out stage of producing a montage for the making of a printing plate, a mask is cut out from a bi-laminated plastics sheet in order that the image areas of the montage will be exposed to the photosensitive non-exposed printing plate whereas other areas will be masked from exposure. The plastics masking sheet is of a commercially available kind and has a transparent base layer and an opaque "red" masking layer which prevents printing plate exposure. To produce a mask, windows are cut in the maskng layer corresponding to the image areas of the montage and the cut areas are separated from the base layer by lifting out say with pressure-sensitive adhesive tape and the remaining portions of the masking layer mask the printing plate.

In one method of producing a montage, the layout is made on the surface of an illuminated table having a glass top with an overlying protective sheet of a translucent plastics material such as polyvinyl chloride or polyethylene forming the work surface.

It is essential that smooth, clean lines of separation are produced in the masking layer since any rough edges will reflect in the final image on the printing plate and thus impair printing quality and for this reason, razor sharp cutting knives have hitherto been used. For many years, mask cutting has been done by hand but this requires skill and takes time. Considerable care has to be taken to control the pressure exerted on the cutting knife not only to avoid cutting into the base layer since any cuts therein could have an affect on the final image but also into the plastics surface of the work table. Large cuts in the base layer may result in "flapping-up" of the base layer with consequent lack of image quality. Cuts in the plastics surface of the table can result in slivers of plastics attaching themselves to the mask and affecting the image quality and in impairment of plastics surfaces and the light transmitting qualities of the protective plastics sheet, and thus as time goes by it may be necessary to replace it. If the cuts are too deep even the glass table top may be damaged.

In more recent years, machines have been developed to perform the mask cutting operation and one such machine known to the applicants, utilises a cutting knife with a diamond cutting edge. However, in order to avoid the aforementioned disadvantages this machine is of complex design and thus costly. To produce curved separation lines in the masking layer the knife itself has to be turned automatically throughout the cutting operation requiring sensitive and complicated control apparatus and circuitry and therefore further increasing costs. Moreover, the time taken to set up such machines can be undesirably long for example up to three weeks which still further increases costs.

Accordingly, it is a main object of the present invention to provide a method of, apparatus for and a tool for separating areas of material in particular plastics material which does not involve a cutting knife, and to provide such a tool which may be adapted to be used with or be an accessory of an existing appartus incorporating a work table which is normally used for other purposes.

To this end, the present invention is characterized in that at least one line of separation is achieved by heated point contact with the surface of the sheet other member.

By means of the heated point, there is no need whatsoever to turn the tool when it follows a curved line on say a sheet of plastics material and the point can be merely in touch contact with the sheet material so that the minimal pressure is used, thereby avoiding the possibility of any separation of the base layer of bi-laminar masking sheet which has been previously referred to. The invention enables the depth of the separation to be confined to whatever is the thickness of the masking layer. Setting up time for apparatus constructed according to the invention can be reduced to a maximum of 3 days and has even been done in as little as one day. Manufacturing costs are considerably reduced as the tool is of simple design and can readily be adapted to be used with or form an accessory of for example the apparatus disclosed in British Patent Specification No. 1,128,207 of our Assignee PROTOCOL ENGINEERING LIMITED, for use in effecting the registration of one or more sets of colour separation or like components, so that the tool can be moved manually or automatically over the plastics sheet. Thus Applicants have found that their invention leads to a surprising effect.

By heating the point to a suitable temperature, as it is moved in touch contact with the surface of the material to be separated, the material is softened and allowed to flow to each side of the point sufficiently to part it from the remainder of the material along smooth, clean lines of separation. The heated point swages a track as it were in the plastics material.

The temperature to which the point is heated and maintained will depend upon the nature of the material and must be consistent with providing the requisite degree of melting of the sheet. Preferably, the temperatures may be controlled by providing a facility for temperature variation to suit the particular material used. For example, Applicants have found a controlled temperature in the range of 70° to 130° C. to be suitable for plastics materials and a temperature of about 80° C. to be acceptable for the plastics masking sheets which they have used.

Although the separating point may be of one dimensional form, i.e. a true point like a needle point, Applicants have found that the best results are achieved by the use of a point having a finite radius i.e. an effective point. Thus, the term "point" as used herein includes within its ambit what is referred to herein as an effective point. The radius of the point may be in the range of 0.001 to 0.010 inch (0.025 to 0.25 mm) with a radius of 0.003 inch (0.076 mm) being preferred.

In a preferred embodiment of the invention, the separating point leads into an inclined surface or surfaces which are symmetrically disposed about an axis extending through the point, the surface(s) being either linear or curved when considered in cross section. Advantageously, an inclined surface of conical form is provided with the point at the apex of the cone.

The included angle at the point may be of any suitable size consistent with providing clean, smooth lines of separation in the material e.g. a plastics masking sheet, for example 60° to 90° but an included angle of 90° is preferred.

The conical shape provides for any variation of the tool from the vertical, for example due to the micron size irregularities in the surface of say the masking sheet base layer or masking layer or due to the surface of a work table being out of horizontal by a few degrees since the inclined surface(s) leads into the line of separation during movement of the point over the masking sheet.

The material of the separating point may be of any suitable material which is suitable for producing smooth, clean, lines of separation in the sheet or other member, e.g. a suitable metal but Applicants have found that diamond provides good results coupled with a satisfactory useful working life of the point.

Conveniently, the conical or other surface or surfaces adjacent the point lead into a shank by means of which a tool member which includes the point may be mounted in a holder member. The axis of the shank is continuous with an axis passing through the point or, alternatively, in another embodiment, the shank may be disposed at an angle to the axis passing through the point. The holder member may be hand held to enable the separating tool to be moved over the surface of the material in which lines of separation are to be produced with the heated point in touch contact therewith or, alternatively, the holder member may be adapted to be supported in a mounting arrangement for attachment to an apparatus for use in moving the mounting arrangement over a surface of the material in which lines of separation are to be formed. For example, the apparatus may have a movable head or the like which is moved manually or driven.

To heat the point, the holder member is conveniently provided with an electrical heating element which may be in the form of a cartridge or of a transistor arranged to transmit heat to the material of the tool member. The holder member preferably has an outer covering, shell or surface of an insulating material to prevent the transmission of heat to the user's hand or to the mounting arrangement or apparatus which moves the point. Preferably, the heat is transmitted from the heating element to the tool by providing a heat conductive material such as copper or brass in association with the heating element in the holder member. In an alternative embodiment of the present invention, the heating element may be contained within the tool member which may be made of diamond, e.g. in the tool tip particularly where the tip is of diamond, which can facilitate control of the temperature of the heated point.

The holder member conveniently has some means of locating it in the mounting arrangement and which is preferably designed for use as an accessory to the register apparatus disclosed in our Assignee's aforementioned British Patent Specification No. 1,128,207 in which case the holder member will be attached to the drilling head which is movable over the surface of the work table, or alternatively to a punching head for the same purpose.

Preferably, the mounting arrangement includes electrical means such as a solenoid for bringing the point into or out of touch contact with the surface of the material to be separated, the electrical means being connected to suitable switching means. The head is preferably driven with two degrees of movement by means of two electric motor driven drive means using a control means which may be a manually operated remote control device of a computer which is programmed to provide the movements required to produce the separation lines in the sheet or other member, as described in the specification of the co-pending British Patent Application No. 8302229, of our Assignee PROTOCOL ENGINEERING LIMITED the subject matter of which is incorporated into the specification of the present application by reference.

It will be appreciated from the foregoing that the present invention has a number of aspects, namely a method of forming at least one line of separation in a sheet or other member, a separating tool, a mounting arrangement supporting the separating tool, and an apparatus in which the mounting arrangement with the separating tool are mounted to enable the separating tool to be moved with its heated point in contact with a surface of the sheet or other member.

In order that the invention may be more readily understood, reference will now be made, by way of example, to the accompanying drawings, in which:

FIG. 1 is a part-sectional side elevation of one embodiment of a separating tool constructed in accordance with the present invention, FIG. 2 is a cross-section taken along the line II—II of FIG. 1.

Figure 3:
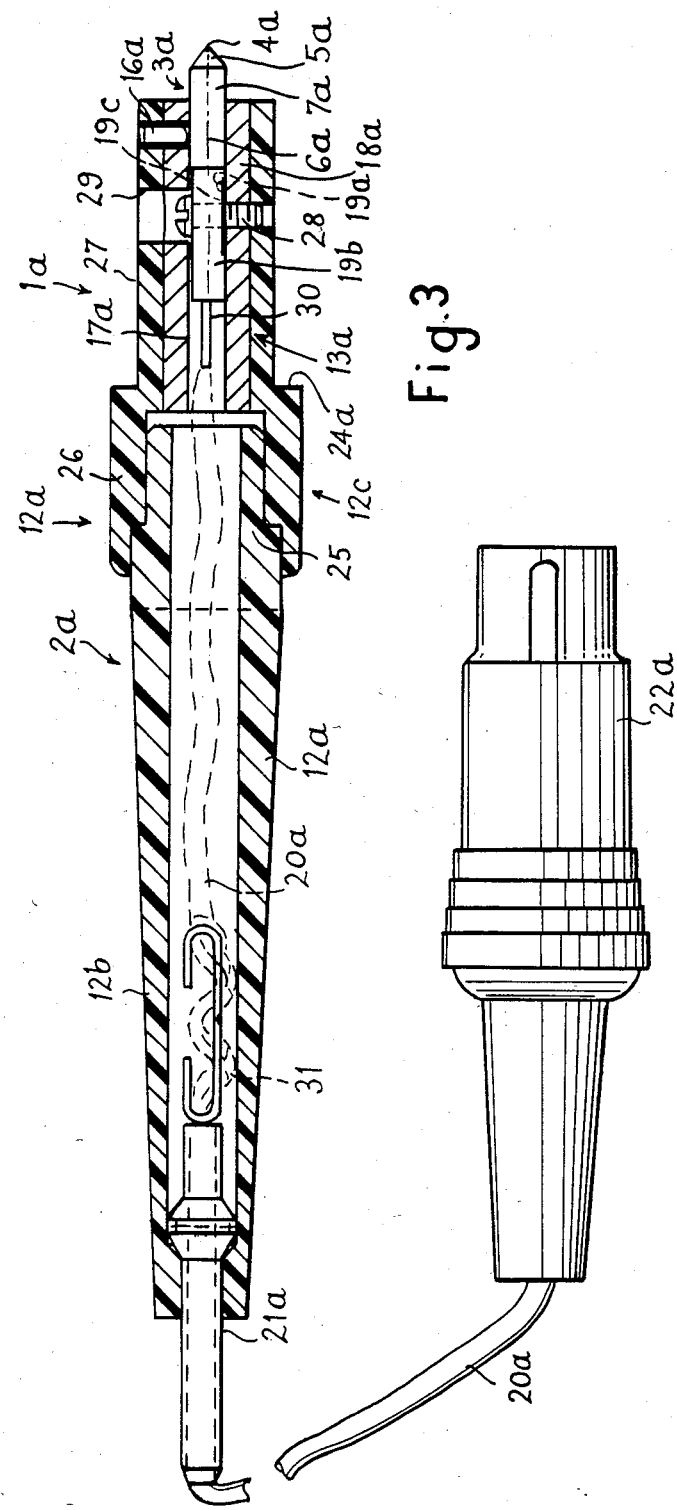
FIG. 3 is a part-sectional side elevation of another embodiment.

Referring to FIGS. 1 and 2 of the drawings, the separating tool is generally indicated at 1 and comprises a holder member 2 and a tool member 3 mounted in the holder member and terminating in a separating point 4 formed by the apex of a conical portion 5. The conical portion 5 is symmetrically disposed about the axis 6 of the tool member 3 which axis extends through the point 4. The separating point 4 has an included angle of 90°, as shown in FIG. 1 and a radius of 0.003 inch (0.076 mm). The conical portion 5 leads into a smaller diameter cylindrical portion 7 which is joined by a frusto-conical portion 8 to a larger diameter cylindrical portion 9 which terminates in a shank portion 10 having a diameter which is intermediate that of the larger and smaller diameter 9 and 7. In an alternative where the shank portion 10 is threaded, the larger diameter cylindrical portion 9 may have diametrically opposed flats for accepting a tool for screwing the shank portion into the holder member 2.

The holder member 2 comprises an outer cylindrical shell 12 of a suitable insulating material and a conducting member 13 of a metal having good heat conductive properties, such as brass, fitted in the opening at one end of the shell. The conducting member has a smaller diameter bore portion 14 having an axis which is coincident with the longitudinal axis of the holder member 2 and with the axis 6 of the tool member 3 when the shank portion of the tool member is fitted in the bore portion 14. A step portion 15 of the tool member 3 abuts a flat end surface of the conducting member 13 and the tool member is held in the holder 2 by means of a grub screw 16, accommodated in internally threaded apertures in the shell 12 and conducting member 13.

Figure 5:
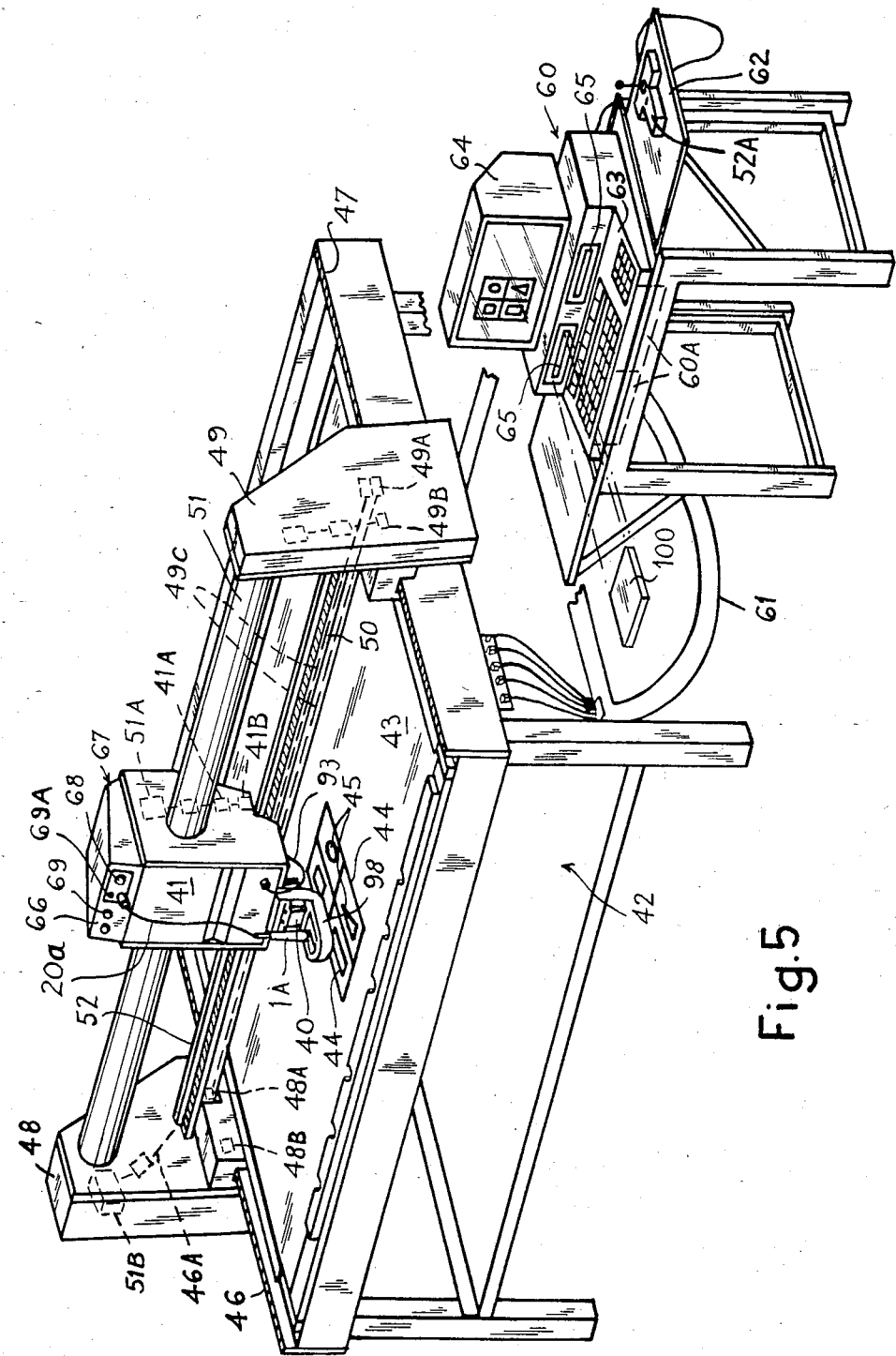
FIG. 5 is a perspective view of one form of apparatus for use in the registration of colour separation or like components and showing the tool of FIG. 3, supported in a mounting arrangement secured to a movable head of the apparatus.
Figure 6:
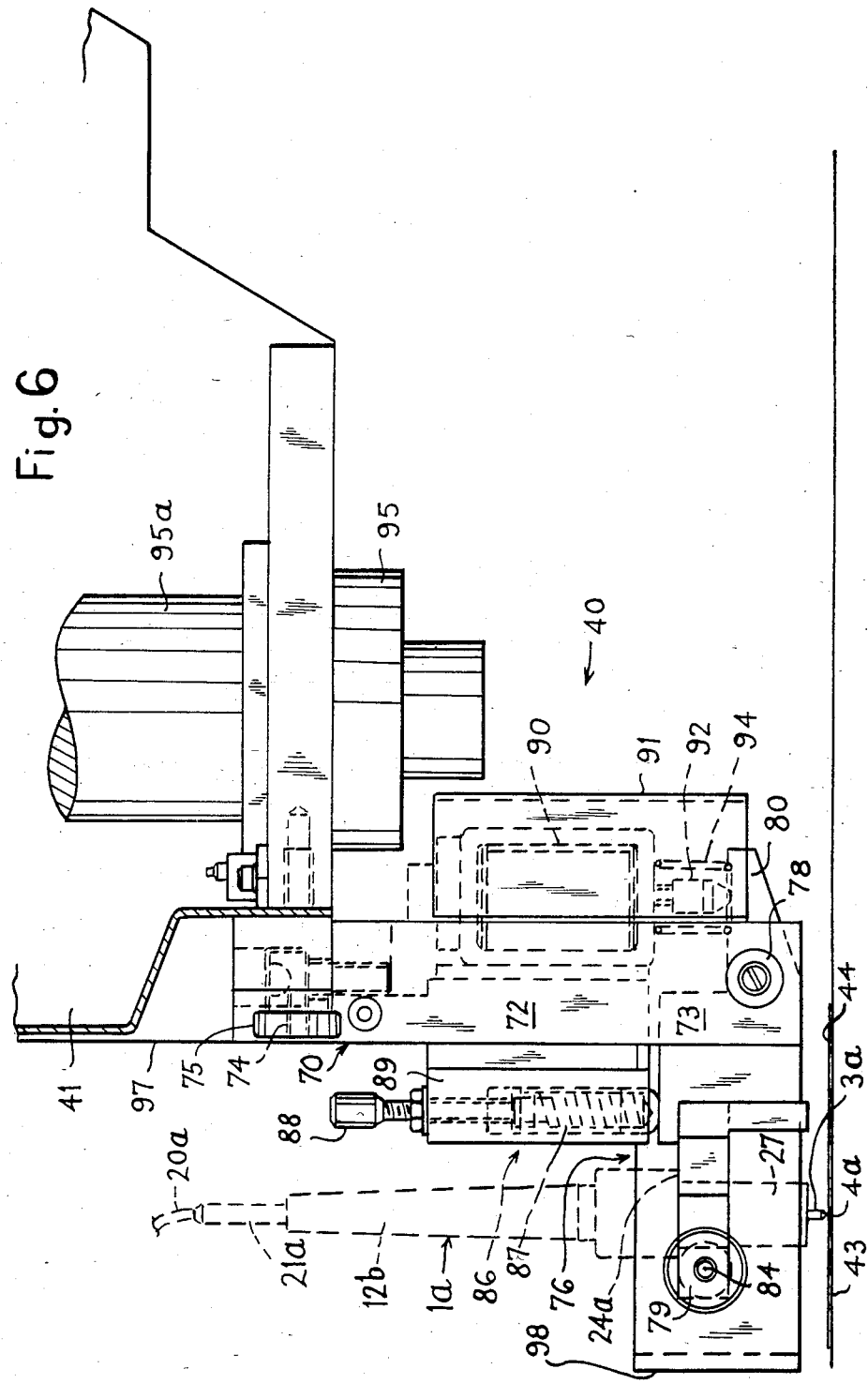
FIG. 6 is a side elevation to an enlarged scale of the mounting arrangement and part of the head shown in FIG. 5.
Figure 7:
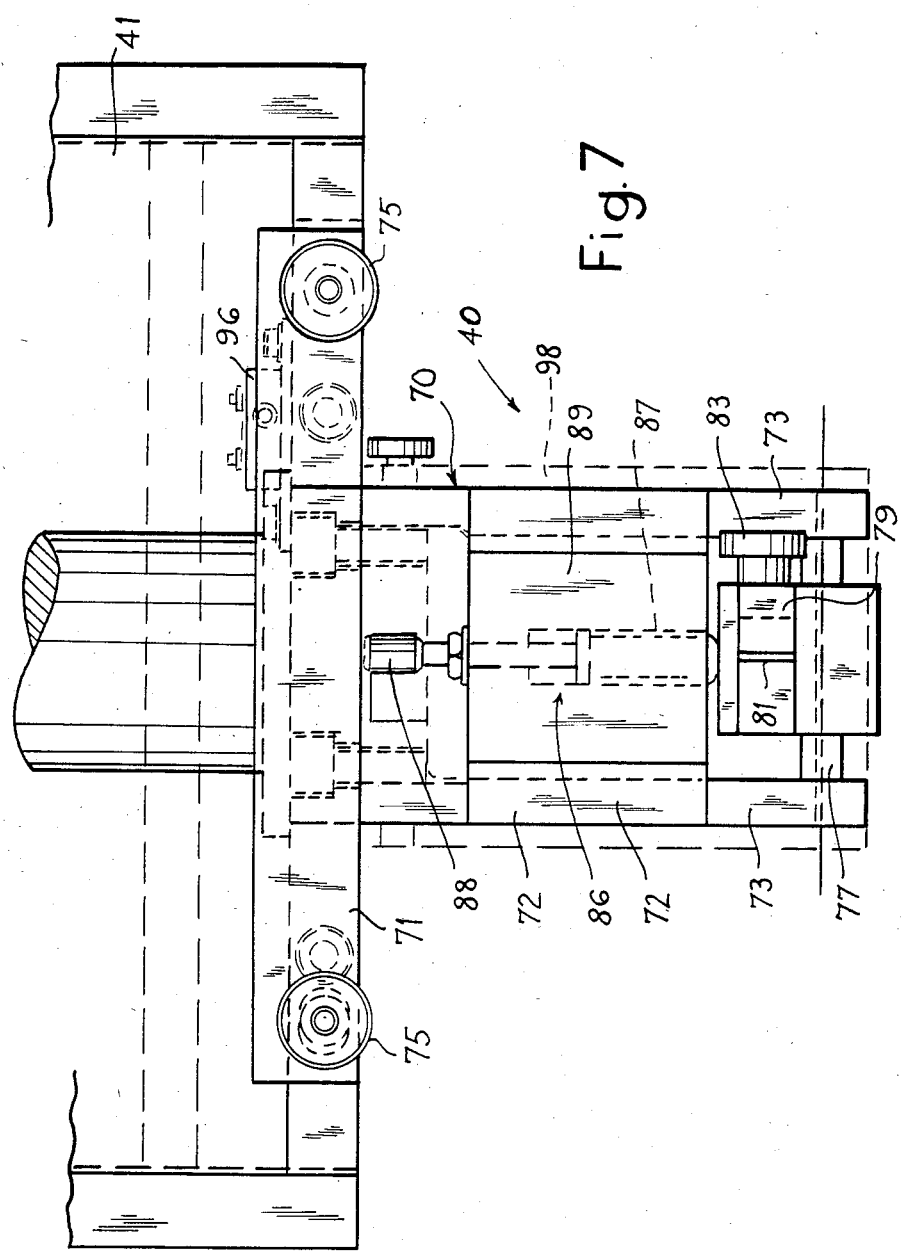
FIG. 7 is a front elevation of the mounting arrangement and part of the head shown in FIG. 5.

The conducting member 13 has a co-axial larger diameter bore portion 17 which is defined by a relatively thin walled cylindrical portion 18 and into which fits a cartridge-type electrical heating element 19. The heating element 19 has the wires of an electrical lead 20 connected thereto which pass out of the holder member 2 through an aperture in a grommett 21 which is fitted in the other open end of the shell, for connection to the source of electricity by means of a suitable plug 22. A cylindrical spacer 25 is disposed within the shell 12 between an end of the heating element 19 and the grommet 21. In operation, the heating element 19 transmits heat to the conducting member 13 from its outer cylindrical surface to the cylindrical portion 18 and from its end to the part defining the bore portion 14. The heat is transmitted to the tool member 3, directly from the end of the heating element 19 to the end of the shank portion 6, and indirectly from the flat end of the conducting member 13 to the cylindrical portion 9 via the step 15. Excess heat is vented through vent apertures in the shell 12, constituted by four slots 23 spaced around the circumference of the shell by 90°. In one form of use of the separating tool 1, the holder member 2 is hand held and moved manually over, say a bilaminar sheet of plastics material with the heated separating point in contact with the top layer of the sheet. In this embodiment, the arrangement of the heating element and its rating controls the temperature of the separating point 4 such as to provide a melting action on the plastics material which is consistent with smooth clean lines of separation. In another form of use of the separating tool, the holder member 2 is mounted in a mounting arrangement such as illustrated in FIGS. 5 to 7, for use in moving the tool, for which purpose the shell 12 is provided with an integral location flange 24.

Referring now to FIG. 3, in which the same or similar parts of the separating tool have been designated with the same reference number identified by the character "a", the separating tool 1a has a holder member 2a, a tool member 3a and a heating element 19a which are differently constructed to those of the embodiment of FIGS. 1 and 2. The shell 12a is in two parts, one part 12b being of open ended tapered tubular form with a stepped end region 25 at its end of greater diameter over which is fitted a complementary annular connecting end 26 of the other part 12c. The connecting end 26 of the part 12c has a location shoulder 24a which leads into an integral outer tubular portion 27 of lesser diameter in which is fitted a conductive member 13a consisting of a tubular portion 18a, whose bore 17a removably accommodates the heating element 19a and the shank 7a of the tool member 3a. The heating element 19a, comprising a heater transistor, is supported by an insulator 19b secured in the bore 17a by means of a screw 28 which is screwed into a threaded bore in tubular members 18a and 27 and is accessible through an aperture 29 to permit insertion and removal of the screw 28.

The tool member 3a of this embodiment is of simpler form to the tool member 3 of FIGS. 1 and 2 in that its shank portion 7a is formed by increasing the length of the cylindrical portion 7 and omitting the parts 8, 9 and 10 of the tool member 3 of FIGS. 1 and 2. Thus, the shank portion 7a is fitted in the bore 17a such that it abuts the adjacent end of the insulator 19b which acts as an end stop to provide for precise location of the heated point 4a with respect to the surface of the work when the tool is supported in a mounting arrangement to be described. The heater transistor 19a is fixed to a metal plate 19c which forms a heat sink and which is in heat transmitting contact with the heat conductive member 18a. Whereas, in FIGS. 1 and 2, the point 4 is made of the same material as that of the tool member 3 in FIG. 3, the tool member 3a has a diamond tip forming the separating point 4a. Three terminals 30 (FIG. 4) project from the insulator 19b to connect the heater transistor 19a with the wires of the electrical lead 20a which is supported in the bore of the shell 12a by means of a clip 31 and an elongate grommet 21a.

In the conventional use of semi-conductors, the heating effect is potentially dangerous to the life of the component and consequently heat sinks are fitted to the more powerful semi-conductors to dissipate unwanted heat. However in the embodiment of FIG. 3 the heat generated within heater transistor 19a is essential to the operation of the device.

The temperature rise of heater transistor 19a is a function of its base-emitter voltage. Since the value of this voltage can be related directly to temperature, this inherent characteristic is used in the control circuit to be described to control and maintain the temperature of the transistor and thus of the point 4a of the tool member 3a at a predetermined value.

Figure 4:
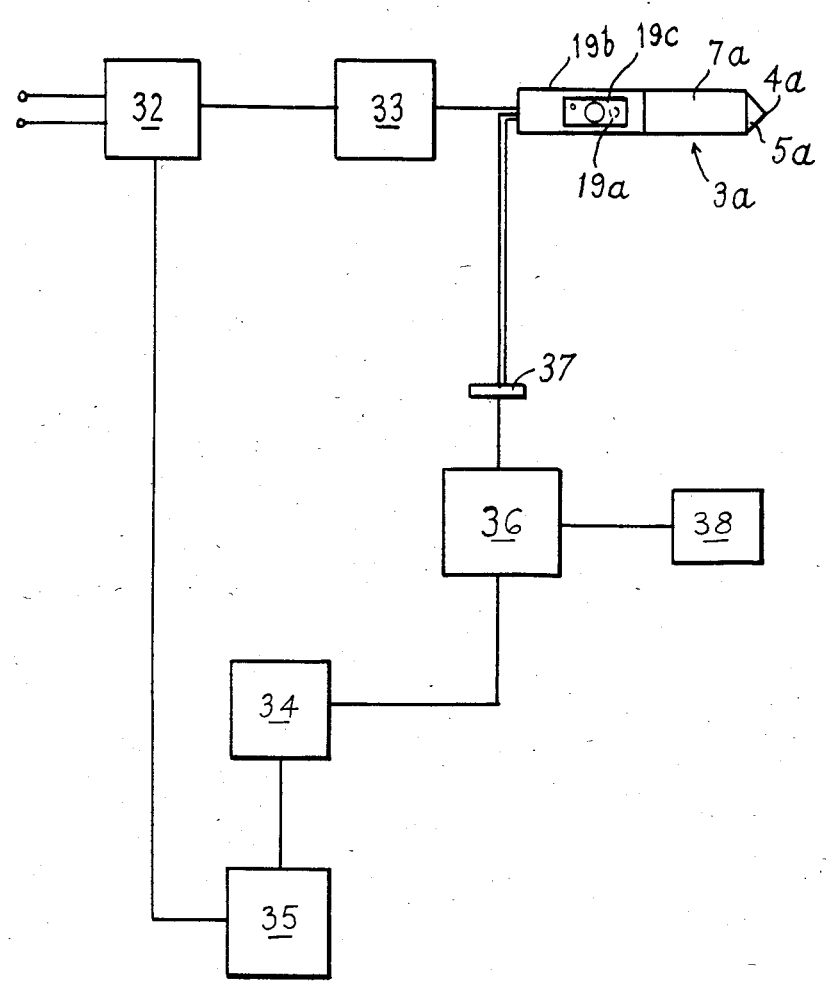
FIG. 4 is a block diagram of a heating circuit for a heating element of the embodiment of FIG. 3.

Thus, FIG. 4 shows a rectified supply circuit 32 connectible via terminals to the mains supply for producing a rectified half wave supply which is connected via an inverter circuit 33, to the base-emitter junction of the heater transistor 19a. The current from the output of the inverter circuit 33 passing through the base-emitter junction of heater transistor 19a produces a base-emitter voltage which is related to the temperature of the heater transistor. This voltage is compared with a reference voltage, taken from a voltage divider circuit 34 supplied with a voltage taken from the output of a circuit 35 connected to the circuit 32, by a first differential amplifier in an amplifier circuit 36. The output signal from the amplifier is stored in a capacitor such that when a power cycle commences the capacitor discharges into one input of a second differential amplifier in the circuit 36, the output of which drives a heater transistor 37 which in turn drives transistor 19a, feedback being taken from the emitter of transistor 19a into the other input of the second amplifier. Another voltage from circuit 35 is supplied to the collectors of transistors 19a and 37.

The timing of the measurement and power periods is carried out by means of a switching circuit 38 including CMOS analogue switches of which two switches are controlled by signals taken from the outputs of two inverters of circuit 33, and the third switch by the output signal of another inverter of the inverter circuit 33.

Reference will now be made to FIG. 5, in which the separating tool 1a is supported in a mounting arrangement which is generally indicated at 40 attached to the drilling or punching head 41 of an apparatus for moving the mounting arrangement and thus the tool 1a over at least two degrees of movement. The apparatus comprises a work table 42 having an illuminated work supporting surface 43, the work, in this instance, being a bi-laminated plastics sheet 44 for the production of a mask, in the upper layer of which lines of separation 45 have already been produced by the movement of the heated point of the tool 1a in contact with the surface of the sheet. The head 41 is mounted to move with one degree of movement along an elongate guide tube 51 extending between two carriages 48, 49 supported by respective pinion gears 48A, 48B and 49A,49B in engagement with two parallel racks 46 and 47 respectively extending along opposite ends respectively of the work table 42 whereby the carriages move the head with another degree of movement along the racks. In one mode of operation in which the pinion gears are freely rotatable, the head 41 is moved manually with two degrees of movement whereas in another mode of operation the head 41 is driven along the guide 51 and the carriages 48 and 49 are driven along the racks by respective drive systems 41A and 46A which include respective electric motors. The electric motors may be stepper motors, linear motors or D.C. servomotors. The system 46A is carried by the carriage 48 and includes the pinion gear 48A, the drive being taken to the carriage 49 by means of two parallel shafts 49C on the lower of which the pinion gears 48A and 49A are fixed, so that the carriages can be driven in synchronism along the racks. The shafts 49C extend lengthwise of the table in an elongate support structure 50 which interconnects the carriages together for the synchronous movement transversely of the work table 42 along the racks 46 and 47.

In order to drive the head 41 along the guide 51, the head 41 carries at its rear the drive system 41A which has a pinion gear 41B engaging with a rack 52 extending lengthwise of the table 42 and fixed to the upper surface of the support member 50. The electric motors 51A and 51B of the head and carriage drive systems may be driven by means of a remote control device as indicated at 52A which has a joystick to enable the head 41 and thus the tool 1a to be moved to produce the required lines of separation in the work.

Preferably, as illustrated, the movements of the head 41 and thus of the tool 1a are controlled by a computer 60 via a motor interface control unit 60A and lead 61 connected to the respective head and carriage motors. The computer 60 is supported on a trolley 62 at one end of the work table 42 and comprises a keyboard 63 and visual display unit 64. The keyboard 63 is provided with two drive units 65 into one of which a computer programme on a floppy disk 100 may be inserted for controlling, say a mask cutting operation on the sheet 44 to a pattern dictated by the programme. As will be seen from the visual display unit 64, the mask cutting pattern shown on the screen corresponds to that on the sheet 44. The plug 22a of the lead 20a from the tool 1a is plugged into a socket on the front panel 66 of a control cabinet 67 forming the top of the head 41. The control cabinet houses the heating circuit illustrated in FIG. 4 for the tool 1a and has a temperature control knob 68 for varying the operating temperature of the tool in the range of 70° to 130° C. The panel 66 also has an on/off switch 69 and indicator light 69A for the heating circuit for the tool 1a.

Figure 8:
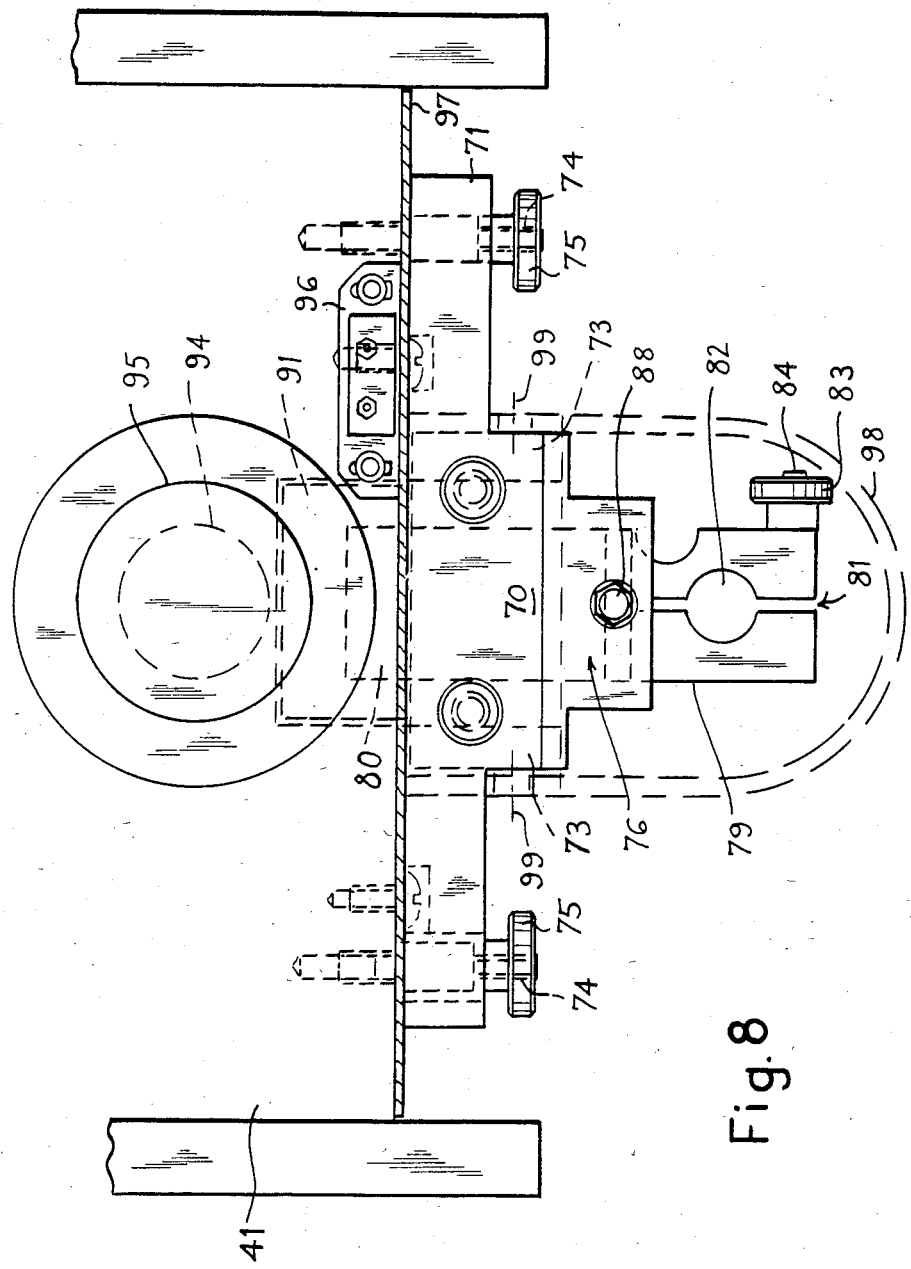
FIG. 8 is a plan view of the mounting arrangement and part of the head shown in FIG. 5.

Referring more particularly to FIGS. 6 to 8, which show the mounting arrangement 40 in greater detail, the mounting arrangement comprises a support bracket 70 which is generally of T-shape with the bar 71 of the T being generally horizontal and the leg 72 of the T being generally vertical in the mounted position on the head 41. The lower end region of the leg 72 is bifurcated to form two side members 73. The mounting arrangement is mounted on the front of the head 41 by means of two screw threaded members 74 which project through respective apertures in the bar 71 and which are engaged by milled-edge threaded nuts 75 which fix the mounting arrangement securely to the head.

A lever 76 is fixed to a pivot shaft 77 mounted in bearings 78 (only one shown) in the side members 73 and extends from the pivot shaft between the side members both forwards and rearwards of the leg 72 to form a clamping arm 79 and an actuating arm 80 respectively. The clamping arm 79 has a central longitudinal split as indicated at 81 to form two clamping members with a mounting aperture 82 for receiving the separating tool 1a (shown in dashed lines in FIG. 6) being located intermediate the ends of the split. The tool 1a is supported in the clamping arm 79 with its shoulder 24a resting on the upper surface of the arm 79 and with the tubular insulating portion 27 projecting through the aperture 82 so that the point 4a of the tool member 3a can contact the surface of the bi-laminated sheet 44 supported on the work surface 43. The clamping arms have a degree of resilience so that when the milled-edged clamping nut 83 is tightened on the screw 84 the tool 1a is securely held in the clamping arm 79.

A spring loaded adjuster 86 including a compression spring 87 and an adjusting knob 88 for varying the spring pressure is mounted in a bracket 89 fixed to the leg 72 and bears on the upper surface of the clamping arm 79 rearwards of the split 81 to maintain the heated point 4a in resilient contact with the sheet 44 and thereby control the contact of the point. In order to lift the tool point 4a out of contact with the sheet 44, an electrical actuating solenoid 90 is mounted on the rear surface of the support bracket leg 72 and is enclosed by a protective cover 91. The solenoid 90 has an armature 92 which bears on the upper surface of the actuating arm 80, so that when the solenoid is energized with electricity by operating a switch (not shown) via a lead 93 plugged into the front of the head 41 as shown in FIG. 5, the armature extends and pushes the arm 80 downwards against the action of the spring 87 to lift the clamping arm 79 and bring the tool point 4a out of contact with the sheet 44. A cushioning compression spring 94 is interposed between the actuating arm and the solenoid 90 to control the downward movement of the clamping arm 79 by the action of the spring 87 when the solenoid is de-energized so that the heated tool point 4a is brought gently into contact with the sheet 44 and provides a counterbalancing action.

The head 41 also carries a drill or punch chuck 95 mounted for vertical movement with respect to the head 41 on a guide 95A. In order to ensure that the chuck 95 is not actuated during operating of the tool 1a, a microswitch 96 is provided behind the front plate 97 of the head which is actuated when the bar 71 of the support bracket 70 is screwed against the front plate, to disconnect the supply of electricity to the chuck.

Preferably, as shown in FIGS. 5 and 8, a protective cover 98 of a transparent plastics material has a lower portion which extends around the clamping arm and vertical arms which are fixed to the vertical sides of the leg 72 adjacent the bar 71 by screws diagrammatically indicated by the dashed lines 99 in FIG. 8.

For a mask cutting operation, using the apparatus of FIG. 5, the mounting arrangement 40 is mounted on the head 41, which action always energizes the solenoid 90 so that the point 4a of the tool member 3a is clear of the work surface 43. The temperature control knob 68 is turned to the temperature appropriate for the material of the sheet 44 placed on the work surface 43 and the switch 69 is switched to the on position to operate the heating circuit to heat the tool member 3a.

The floppy disc 100 containing the mask cutting programme is then inserted into one of the drive units 65 of the computer 60, this action energising the solenoid 90. The programme data is entered "interactively" into the computer's internal memory, via the keyboard 63 in response to programme commands displayed on the visual display unit 64 when the desired pattern of the mask cutting operation to be carried out has been selected, in this case just the pattern in the one sheet 44. The displayed mask cutting pattern is initiated by operating the keyboard. This causes the computer to emit electrical signals via the motor interface control unit 60A, to the drive motors for the head 41 and carriages 48, 49 to drive the head 41 into a position over the sheet 44 where a mask cutting operation can commence. The the computer sends an electrical signal to the solenoid switch so that the solenoid is deenergized to bring the heated point 4a into contact with the surface of the sheet 44 and the electrical drive signals from the computer cause the drive motors to move the head in a mask cutting operation with the heated point 4a forming the lines of separation in the upper photographically opaque masking layer of the sheet 44 as dictated by the programme. When the programme is completed, the solenoid 90 is energized to lift the heated point 4a out of contact with the sheet 44 and the switch 69 actuated to the off position to render the heating circuit inoperative. The completed sheet can then be taken from the work and the parts of the masking layer removed in the usual way to complete the mask. The operation of the computer is more fully described in the patent application filed on the same day as the present application and claiming priority from out aforementioned patent application, the subject matter of both applications being incorporated in the specification of the present application by reference.

It should, of course, be appreciated that the mounting arrangement 40 is also suitable for supporting the tool 1, of FIGS. 1 and 2 and for mounting the tool 1 in the apparatus illustrated in FIG. 5.

In another embodiment, the computer switches on circuit 32, and controls the relationship between the temperature of the heated point and the velocity of the head 41 and thus the tool 1a. Thus, the computer can regulate both tool temperature and velocity to increase the temperature when being moved at higher speeds say, straight lines, and to decrease the temperature when the tool point has to be moved in tight arcs and to produce corners.

It will be appreciated that various modifications may be made without departing from the scope of the invention. For example the separating tool can be mounted in any other suitable machine or apparatus for producing the required movement of the tool, either manual or automatic, instead of the apparatus described. If desired, or in appropriate instances, the separating tool can be hand held and moved manually with its heated point in contact with the surface of the material in which lines of separation are to be formed. In such a case where the transistor with its associated heating circuit is used, the heating circuit and other controls therefor may be contained in a portable housing. Moreover, although the invention has been specifically described with reference to producing lines of separation in a bilaminar masking sheet of plastics material, it could also be used to produce lines of separation in nonlaminated sheets and other members which are not of sheet form.

For example, lines of separation may be produced in plastic coatings on metals such as stainless steel, the coating removed and the exposed metal subjected to treatment such as shot blasting for producing signs.

We claim:

1. Apparatus for producing a line of separation in a work surface of plastic and the like, comprising:
   a work support-surface for supporting a work surface of plastic and the like;
   a head movably mounted above said work support-surface for movement in orthogonal directions across said work support-surface;
   a mounting arrangement mounted on and dependent from said head;
   a tool for forming a line of separation in a work surface, said tool being releasably supported in said mounting arrangement and including a tool member having a separating point for effecting a line of separation, a tool body having a holder for said tool member, said holder being made of a heat-conductive material, and a heating element associated with said tool body, said heating element and said holder being positioned such that heat is conducted from said heating element to said holder and said tool member, and from said holder to said tool member, said holder releasably receiving a portion of said tool member remote from said separating point, said tool member being positioned relative to said tool body such that a portion thereof projects from said tool body and said holder to said separating point, said projecting portion extending in freely-exposed manner from said body and said holder such that a work surface may be engaged solely by said point, said point including a tip and a surrounding surface extending therefrom in divergently inclined manner; and
   said mounting arrangement including a pivot and a pivotable lever spaced above said work support-surface and extending on opposite sides of said pivot, said pivot forming a pivot axis for said pivotable lever extending transversly of said work support-surface, a portion of said lever at one side of said pivot forming a clamp arm releasably securing said tool with said separating point extending below and remotely from said clamp arm towards said work support-surface, and a portion of said lever on an opposite side of said pivot forming an actuating arm, actuator means engaging said actuating arm for moving said actuating arm in at least one sense about said pivot to bring said separating point into and out of contact with work on said work support-surface.

2. Apparatus as claimed in claim 1, in which the holder for the tool member is surrounded by an insulating member forming part of the tool body.

3. Apparatus as claimed in claim 2 in which the separating point tip has a radius of between 0.001 and 0.010 of an inch.

4. Apparatus as claimed in claim 3 in which the radius is 0.003 inch.

5. Apparatus as claimed in claim 2 in which the surrounding divergent surface extends from the tip at an included angle of between 60° and 90°.

6. Apparatus as claimed in claim 2 in which the surrounding divergent surface is of conical form.

7. Apparatus as claimed in claim 2 in which the heating element is connected to a heating circuit including control means responsive to and adapted to regulate the temperature of the heating element.

8. Apparatus as claimed in claim 7 in which the control means are adapted to regulate the temperature of the heating element within the range of 70° to 130° C.

9. Apparatus as claimed in claim 1, in which the actuator means is electrically operated and is energisable to lift the clamp arm and the tool and is deenergisable to lower the clamp arm and the tool, and resilient means are provided which act on the clamp arm resiliently to bias the separating point towards the work support-surface when the actuator means is deenergised.

10. Apparatus as claimed in claim 9, in which a further resilient means acts on the actuating arm in opposition to and of weaker force than said resilient means acting on the clamp arm, whereby to provide a cushioning and counterbalancing effect.

11. Apparatus as claimed in claim 9 in which means are provided for adjusting the biassing force of the resilient means.

12. Apparatus as claimed in claim 1 wherein said tool body includes an insulating member positioned to surround said holder, and wherein said clamp arm releasably engages said insulating member for securing said tool.

* * * * *